(12) United States Patent
Anderson et al.

(10) Patent No.: US 8,568,527 B2
(45) Date of Patent: Oct. 29, 2013

(54) PROCESSED MINERAL ADDITIVE FOR REDUCING CONCRETE PERMEABILITY AND INCREASING STRENGTH

(76) Inventors: Terry L. Anderson, Santa Rosa Beach, FL (US); John Andrew Coleman, Santa Rosa Beach, FL (US); Neal S. Berke, Chelmsford, MA (US)

( * ) Notice: Subject to any disclaimer, the term of this patent is extended or adjusted under 35 U.S.C. 154(b) by 9 days.

(21) Appl. No.: 13/374,935

(22) Filed: Jan. 24, 2012

(65) Prior Publication Data

US 2012/0192767 A1    Aug. 2, 2012

Related U.S. Application Data

(60) Provisional application No. 61/438,276, filed on Feb. 1, 2011.

(51) Int. Cl.
*C04B 14/18* (2006.01)

(52) U.S. Cl.
USPC ........... 106/705; 106/713; 106/724; 106/737; 106/738; 106/789; 106/DIG. 2

(58) Field of Classification Search
USPC ......... 106/713, 724, 737, 738, 789, 705, 718, 106/DIG. 2
See application file for complete search history.

(56) References Cited

U.S. PATENT DOCUMENTS

| | | | |
|---|---|---|---|
| 2,853,394 A | 9/1958 | Riddell et al. | |
| 4,210,457 A | 7/1980 | Dodson et al. | |
| 4,963,191 A | 10/1990 | LaFleur | |
| 5,114,617 A | 5/1992 | Smetana et al. | |
| 5,174,819 A | 12/1992 | Carlson | |
| 5,294,255 A | 3/1994 | Smetana et al. | |
| 5,356,446 A | 10/1994 | Smetana et al. | |
| 6,290,769 B1 | 9/2001 | Carkner | |
| 6,402,830 B1 * | 6/2002 | Schaffer | 106/675 |
| 7,736,431 B2 | 6/2010 | Bui | |
| 7,748,453 B2 | 7/2010 | Reddy | |
| 8,167,996 B2 * | 5/2012 | Bui | 106/713 |
| 2009/0011207 A1 | 1/2009 | Dubey | |
| 2011/0100626 A1 | 5/2011 | Brenneis et al. | |
| 2011/0155019 A1 | 6/2011 | Albright et al. | |

OTHER PUBLICATIONS

ANON. "Standard Specification for Concrete Aggregates" C33/C33M—11a, ASTM International, 2011.

* cited by examiner

*Primary Examiner* — Paul Marcantoni
(74) *Attorney, Agent, or Firm* — Robert J. Lauf

(57) ABSTRACT

A durable concrete composition includes a cementitious material comprising cement and ground expanded perlite, coarse aggregate, fine aggregate, and sufficient water for adequate workability. The resulting concrete displays a number of superior properties to conventional concrete, including extremely high thermal resistance coupled with high strength, low chloride ion permeability, and good early strength. The ground expanded perlite is a readily available material and the finished concrete is extremely cost effective for applications where a high strength structural concrete must withstand high temperatures. The mixture can be handled and placed by conventional methods and is compatible with existing conventional concrete additives.

16 Claims, 1 Drawing Sheet

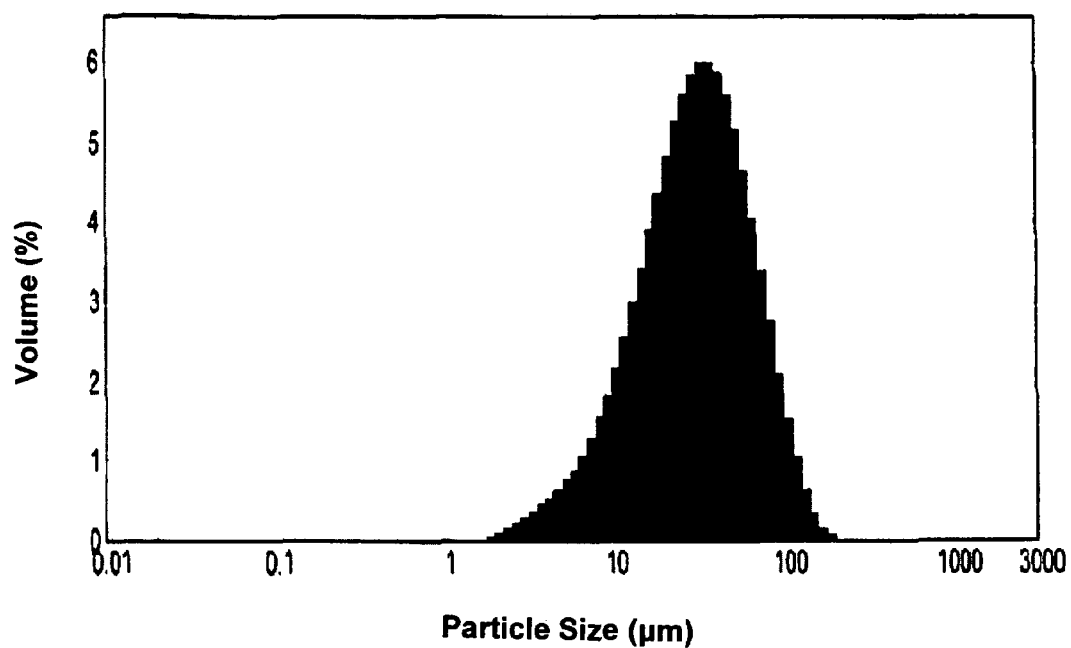

PROCESSED MINERAL ADDITIVE FOR REDUCING CONCRETE PERMEABILITY AND INCREASING STRENGTH

CROSS-REFERENCE TO RELATED APPLICATION

This application claims the benefit of Provisional Patent Application No. 61/438,276 filed on Feb. 1, 2011 by the present inventors, the entire disclosure of which is incorporated herein by reference.

BACKGROUND OF THE INVENTION

1. Field of the Invention

The invention pertains to materials and methods for making heat resistant concrete, and more particularly for a spall-resistant and/or heat resistant concrete. The invention also relates to materials and methods for making high strength concrete.

2. Description of Related Art

In the 1990s, fires in concrete-lined tunnels created a situation of rapidly rising temperature. This rapid rise in temperature led to explosive spalling of large areas of concrete. Large falling concrete chunks proved to be almost as dangerous to trapped motorists as the smoke and fumes from the fires. More recently, the increased heat of vertical take-off and landing aircraft (F-35 and Osprey) have caused great concern that explosive spalling might endanger both crew and aircraft. The process of heat-induced spalling is relatively simple. When concrete is exposed to temperatures above the boiling point of water, moisture in the concrete turns to steam. If the temperature rises more rapidly than the steam can escape, rising pressure causes the concrete to spall. The heat from jet exhaust or vehicle fires is typically much greater (in the range of 1700 to 2000° F.) causing potentially explosive spalling.

Accordingly, there is a need for concrete having improved spalling resistance. There is also a need for concrete having improved compressive and flexural strength, as these properties control how much concrete must be used to support a given design load. Furthermore, given the present interest in reducing the carbon footprint of various manufacturing processes, there is a need for concrete formulations that reduce the production of carbon dioxide during cement making.

Modern concrete mixes typically contain various additives in addition to cement, water, and aggregate. Some familiar additives include ground blast furnace slag, coal ash, and expanded perlite. Expanded perlite is typically used as an additive primarily in lightweight applications to provide thermal barriers for fire protection. The perlite materials that are used are typically quite coarse and added in fairly large quantities. Water-to-cementitious contents are typically above 0.6 by mass and in most cases the material is being used as one of the fine aggregates. Coarse aggregates, as are normal in structural concrete, are not usually present. Some examples of concrete formulations include the following:

U.S. Pat. No. 7,748,453 to Reddy discloses a method of making a wellbore fluid comprising a cement composition that contains cement, ground expanded perlite at 1-100 percent and 2-400 µm size, and water.

U.S. 2011/0100626 to Brenneis et al. discloses a method of making a sellable wellbore fluid composition containing ground unexpanded perlite of 1-100 µm size and 1-75 percent composition; additional components include fly ash, slag cement, metakaolin, and fumed silica.

U.S. Pat. No. 5,114,617 to Smetana et al. discloses a concrete composition that contains 8-65 percent cement, 0.5-20 percent smooth surfaced expanded perlite, less than 0.15-0.6 mm, and may contain fly ash.

U.S. 2009/0011207 to Dubey discloses a lightweight cementitious slurry of 35-60 percent Portland cement, 2-10 percent expanded, chemically coated perlite and at least one of silica fume, metakaolin, blast furnace slag, fly ash as mineral additive; fly ash can be 10-60 percent.

U.S. 2011/0155019 to Albright et al. discloses a cement blend with Portland cement, 0.1-7 percent perlite, 0.1-40 percent fly ash.

U.S. Pat. No. 5,294,255 to Smetana et al. discloses a grout composition with expanded perlite, Portland cement, and fly ash.

U.S. Pat. No. 7,736,431 to Bui discloses a lightweight concrete mix with expanded perlite in the 1-2.5 mm size range.

U.S. Pat. No. 6,402,830 to Schaffer discloses a lightweight concrete composition with pumice and 1-4 percent expanded perlite at minus 3/16 inch to dust in size.

U.S. Pat. No. 5,356,446 to Smetana et al. discloses a cementitious compound with expanded perlite at 100-30 mesh and 10-20 percent.

U.S. Pat. No. 4,963,191 to LaFleur discloses a cementitious composition with Portland cement and expanded perlite.

U.S. Pat. No. 4,210,457 to Dodson et al. discloses a fly ash and Portland cement mixture with expanded perlite.

U.S. Pat. No. 2,853,394 to Riddell et al. discloses that expanded perlite is 300 µm size and 1-3 percent of admixture.

U.S. Pat. No. 7,748,453 to Reddy et al. discloses the use of perlite additive in fairly large amounts for use in flowing non segregating grouts.

U.S. 2011/0155019 to Albright et al. discloses the use of perlite additive. Silica fume is required as are hollow microspheres and titanium oxide. High temperature resistance and strength enhancement are reported benefits. The disclosure includes an OC blend of fused silica, micro-beads, ground expanded perlite, fumed silica, and class C fly ash used with cement and additional C fly ash, ground expanded perlite, and aggregates for a moderate weight concrete for fire performance. High temperature concrete used OC formulation which has a large amount of additional additives including vinyl acrylic copolymer, acrylic latex, and $TiO_2$.

3. Objects and Advantages

Objects of the present invention include the following: providing a structural concrete with improved heat resistance; providing a structural concrete with improved spalling resistance; providing a structural concrete with improved strength; providing a structural concrete with improved resistance to chloride ion penetration; providing a concrete additive that reduces the amount of carbon dioxide generated in manufacture; providing a concrete additive that reduces the amount of Portland cement needed; and providing a concrete additive that improves the strength, heat and spalling resistance, and resistance to chloride ion penetration of structural concrete. These and other objects and advantages of the invention will become apparent from consideration of the following specification, read in conjunction with the drawings.

SUMMARY OF THE INVENTION

According to one aspect of the invention, a durable concrete composition comprises:
  13 to 18 weight percent cement;
  ground, expanded perlite in an amount equal to about 2 to 25% of the cement;
  30 to 45 volume percent coarse aggregate;
  25 to 30 volume percent fine aggregate; and
  water in an amount sufficient for workability.

According to another aspect of the invention, a durable concrete composition comprises:
  13 to 18 weight percent cementitious content, the cementitious content comprising 98 to 75% Portland cement and 2 to 25% ground, expanded perlite;
  30 to 45 volume percent coarse aggregate;
  25 to 30 volume percent fine aggregate; and
  water in an amount sufficient for workability.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing FIGUREs, wherein like numerals (if they occur in more than one view) designate the same elements. The features in the drawings are not necessarily drawn to scale.

FIG. 1 is a plot of the particle size distribution of a ground, expanded perlite suitable for use in the invention.

DETAILED DESCRIPTION OF THE INVENTION

This invention comprises a novel use of ground expanded perlite as a pozzolan in structural concrete and mortar. Previous uses of perlite have generally been in coarser form to act as a lightweight aggregate, although ground perlite is disclosed in some of the applications discussed above for oil well applications and a high temperature product with silica fume and hollow spheres. Expanded perlite is a type of perlite that has been heated to temperatures typically in the range of 1650 to 1900° F., at which point the glassy material softens. Residual moisture vaporizes, expanding the softened glass to 7-15 times its original volume. The expanded material is typically bright white because of the reflectivity of the trapped gas bubbles. Unexpanded (raw) perlite has a specific gravity of 2.2 to 2.4. Expanded perlite has a volume density on the order of 2 pounds per cubic foot.

The invention addresses three key issues facing the structural concrete and mortar industry. These are the reduction of greenhouse gases, improving the durability of concrete and mortar, and doing so without adverse effects on strength. In addition, the material used in this invention is readily available and does not darken concrete as is the case with silica fume and some fly ashes.

The invention reduces greenhouse gases by substituting for cement. The manufacture of the inventive material requires less heat than is used in cement production and in addition does not release additional carbon dioxide from the conversion of limestone to Portland cement. In addition, strength is increased so overall cement levels can be decreased more, either by using less cement to meet strength requirements, or less concrete is needed at higher strength levels.

Durability is improved with a large unexpected decrease in permeability at relatively low doses for a material at this particle size. Dosage rates are under 10% cement replacement, whereas fly ash or ground granulated blast furnace slags need to be used from 15% and typically 25% or more for fly ash and 40% or more for slag to achieve permeabilities comparable to what is achieved with the invention, as will be shown in the examples that follow.

Unlike fly ash or slag there is not an early strength trade off and the product has one-day strengths equivalent to better than silica fume and maintains these strength advantages to at least 90 days of curing.

The invention is a method of reducing the Portland cement content in a mortar or concrete without reducing initial strength and increasing long term strength and reducing long-term and early permeability by use of the addition of ground expanded perlite as a cement replacement (CenterStar). According to one preferred example, the size characteristics are 100% of the particles less than 200 μm, 90% below 80 μm, with a volume weighted mean of approximately 38 μm. It will be appreciated that the mean particle size can be varied over some range without departing from the spirit of the invention. This range may vary with particular intended applications as well as with the particular grinding processes and specifications of perlite manufacturers and may range from 10 to 100 μm. This is in contrast to fly ash and ground granulated blast furnace slags that significantly lower the early strength development. The higher early strength is a benefit for removal of formwork and speed of construction operations. The higher long-term strength is useful for design allowing less concrete to be used to meet a given structural requirement, or less total cement to meet the requirements. Advantages include both saving materials cost and reducing the amount of greenhouse gases associated with the concrete or mortar.

In addition, the CenterStar additive provides high early and late day strengths without darkening the concrete, providing a significant plus for higher performance concretes that need to be colored or used in decorative applications.

EXAMPLE 1

A reference concrete was produced at a water/cement ratio of 0.45 and five additional concrete compositions were produced replacing cement with the CenterStar additive at two replacement levels, Type F fly ash, ground granulated blast furnace slag, or silica fume. The w/c level remained at 0.45. The mixtures are shown in Table 1 along with the plastic properties. A commercially available polycarboxylate high range water reducer (Grace ADVA140m) at about 6-20 oz/cwt was used to provide workability and a commercially available air entrain agent (Grace Daravair 1000) at about 4.4%-6.4% was used to provide air typical of that added to concretes exposed to freezing and thawing. The CenterStar mixtures display similar properties to the other mixtures demonstrating that they could be used in commercial production.

TABLE 1

Mixture Designs and Properties

| Mix | Cement (pcy) | CS (pcy) | TypeF FlyAsh (pcy) | SF (pcy) | GGBS (pcy) | CA (pcy) | FA (pcy) | Air (%) | Unit Wt. (pcf) | Yield (pcf) | Init. Set (h) | Final Set (h) |
|---|---|---|---|---|---|---|---|---|---|---|---|---|
| 1. Control | 667 | | | | | 1748 | 1167 | 6 | 143.7 | 26.67 | 4.53 | 5.84 |
| 2. 4% CS | 634 | 26.1 | | | | 1731 | 1149 | 6.1 | 142.1 | 26.9 | 5.15 | 6.56 |
| 3. 8% CS | 615 | 53.8 | | | | 1752 | 1155 | 4.4 | 143.5 | 26.58 | 5.64 | 7.08 |
| 4. 25% FA | 497 | | 165 | | | 1735 | 1117 | 6.1 | 141.1 | 26.85 | 4.71 | 6.13 |
| 5. 8% SF | 600 | | | 52.6 | | 1710 | 1138 | 6.4 | 140.5 | 27.23 | 4.2 | 5.41 |
| 6. 40% GGBS | 404 | | | | 269 | 1765 | 1081 | 6 | 141.5 | 26.39 | 4.65 | 6.35 |

Notes:
Nominal cementitious is 658 pcy, numbers reflect yield. ASTM C 494 Type F&G HRWR and ASTM C260 AEA admixtures were used for workability and air entrainment.

EXAMPLE 2

Table 2 provides the ASTM C39 strength data as a function of time. The CenterStar mixtures at both cement replacements had higher one day strengths than the other mixtures. The 4% replacement mixture was equivalent to or better than the other mixtures from 7 to 90 days. The 8% replacement was significantly better than all the mixtures, including silica fume at the same replacement level.

TABLE 2

Compressive Strength (psi) vs Time (days)

| Mixes | 1 | 7 | 28 | 90 |
|---|---|---|---|---|
| Control | 2790 | 4330 | 5075 | 5900 |
| 4% CS | 3015 | 4895 | 5855 | 6725 |
| 8% CS | 3400 | 5370 | 6625 | 7970 |
| 25% FA | 1910 | 3515 | 4780 | 6025 |
| 8% SF | 2625 | 4895 | 5985 | 7060 |
| 40% GGBFS | 1660 | 4615 | 5735 | 6565 |

EXAMPLE 3

Permeability reductions over time are shown in Table 3. Note that lower Coulomb values indicate a lower permeability and reduced rate of the ingress of chlorides. This is associated with better durability in deicing salt and marine environments. Initial ASTM C 1202 (Rapid chloride permeability) tests data show similar behavior to fly ash (much higher dosage of fly ash), but not as low as silica fume or slag. Over time performance improved similarly to fly ash, and surpassed that of slag at the higher CenterStar addition. Levels were approaching silica fume which essentially stopped becoming less permeable at 56 days.

TABLE 3

ASTM C 1202 Coulombs vs Time (days)

| Mix | 28 | 56 | 90 |
|---|---|---|---|
| Control | 2398 | 2357 | 1785 |
| 4% CS | 1820 | 1362 | 1083 |
| 8% CS | 1395 | 819 | 610 |
| 25% FA | 1429 | 912 | 586 |
| 8% SF | 641 | 505 | 507 |
| 40% GGBFS | 1053 | 895 | 812 |

These data show that the CenterStar additive provides improved strength at all times and enhanced reduction in permeability over time. Cement replacement rates are 3 to 10 times lower than that of fly ash or ground granulated blast furnace slag making this a very efficient material on the order of silica fume.

EXAMPLE 4

CenterStar additive in this example was added to increase the cementitious content over a cement only mixture, and sand was replaced to keep the volumes equal. Table 4 provides the mixture proportions for the reference mix with Portland cement and the Portland cement plus CenterStar additive, at 12.3% of the cementitious content. The workability was reduced somewhat, so a naphthalene sulfonated high range water reducer (BASF, Rheobuild 1000) at 25 oz/cwt was added to achieve equivalent workability for the CenterStar concrete.

TABLE 4

Concrete Mixture Proportions

| MIX | Cement (pcy) | CenterStar (pcy) | Sand (pcy) | Coarse Agg. (pcy) | Water (pcy) | HRWR* (oz/cwt) | AEA** (oz/cwt) | Air (%) | Slump (in) |
|---|---|---|---|---|---|---|---|---|---|
| Reference | 621 | 0 | 1284 | 1753 | 260 | 0 | 1.2 | 5.6 | 3.25 |
| CenterStar | 600 | 84 | 1167 | 1695 | 257 | 25 | 1.25 | 4.5 | 6.25 |

Notes:
Corrected for actual yield.
*On Portland cement and CenterStar-Rheobuild 1000
**On Portland cement and CenterStar--MB AE 90

EXAMPLE 5

Compressive strength data for the formulations in the preceding example are given in Table 5. At early times, unlike a fly ash or slag mixture, strengths are equivalent to the control. At 28 days there is a significant increase in strength with the CenterStar additive. If the material were inert then it would have been expected to behave in a similar manner to the sand that it replaced. However, the increase in strength indicates that it is behaving like a pozzolan and that the effective water/cement ratio dropped from 0.43 to 0.38. This would account for some of the need for additional super plasticizer.

TABLE 5

Compressive strength (psi) vs Time (days)

| MIX | 1 Day | 3 Days | 7 Days | 28 Days |
|---|---|---|---|---|
| Reference | 2645 | 3935 | 4420 | 5300 |
| CenterStar | 2440 | 4025 | 4725 | 6125 |

EXAMPLE 6

Another concrete mix was formulated with 1000 pounds of cement, 324 pounds of fly ash, 270 pounds of silica fume, 1647 pounds of sand, and 87 pounds of ground expanded perlite (the same form as was used in the previous examples). This was mixed with 432 pounds of water (51 gallons) and up to 210 ounces of ADVA 140 (W. R. Grace) super plasticizer to provide concrete of 3773 pounds/cubic yard. Water/cement ratio was 0.27. Weight per cubic foot of fresh concrete was 139 pounds (3861 pounds/cubic yard). This batch had a compressive strength of 4220 psi (5 days), 4720 psi (7 days), and 6770 psi (28 days). A 2 inch tall slice of a 4×8 inch cylinder was placed in an 1800° F. forge with no spalling observed.

EXAMPLE 7

Another concrete mix was formulated with 1000 pounds of cement, 250 pounds of fly ash, 54 gallons of water, 1772 pounds of coarse aggregate, 357 pounds of fine aggregate (sand), 87 pounds of ground expanded perlite, and 238 ounces of ADVA 140 super plasticizer. This mix had 1% air entrainment, a slump of 10 inches, density of 141.8 pounds/cubic foot (3847 pounds/cubic yard). Compressive strength by ASTM C39 was 7430 psi (7 days) and 10660 psi (28 days). Flexural strength by ASTM C78 was 1225 psi.

Samples of this mix were poured into 8 inch thick×24 inch diameter cylindrical molds for testing under simulated jet exhaust applied at Mach 1. [Details of the test facility and methods are described in Technical Report TR-2065-SHR, Development and Analysis of the Naval Facilities Engineering Service Center Aviation Engine Simulation Facility, by E. E. Cooper (1996).] The inventive material passed the test and to Applicants' knowledge only one other material also passed the test; the other material, however, is prohibitively expensive (~$2700/cu yd or about ten times the cost of the inventive material).

EXAMPLE

Another concrete mix was formulated with 770 pounds of cement, 193 pounds of fly ash, 37 gallons of water, 853 pounds of fine aggregate, 1685 pounds of coarse aggregate #1 (SG=2.7), 87 pounds of coarse aggregate #2 (SG 2.36), 48.2 ounces WRDA 64 additive (W. R. Grace), and 77 ounces ADVA 170 additive (W. R. Grace). Slump was 6 inches and air content was 4%. Water/cement ratio was 0.32. Fresh density of the concrete was 144.3 pounds/cubic foot (3896 pounds/cubic yard).

Two samples were cast in 4 inch diameter X 8 inch long cylinders. A third specimen was a rectangular plate. All three specimens were heated on one edge of the finished side using a propane torch (approximately 1800° C. flame temperature) and on the opposite edge using a MAPP gas torch (approximately 5300° C. flame temperature). The areas were heated for 2 minutes at a distance of about 2 inches from the tips of the torches. All three specimens produced a slight red glow when heated with the propane, and a more intense glow when heated with the MAPP gas. No violent pop outs or spalling were observed in the test specimens, in contrast to the behavior expected from a typical concrete sample.

Those skilled in the art of concrete will appreciate that the optimal composition of the mix will vary depending on the particular application. For example, the amount of ground expanded perlite replacing the cement may vary from 2% to 25%, preferably from 2 to 15%, and more preferably from 4 to 15%. For a standard 5000 psi concrete, the preferred amount of ground expanded perlite will range from about 25 to 100 pounds per cubic yard. In general, for many applications, the amount of cement plus perlite will be about 13 to 18 percent by weight of the total mix.

For adequate strength in structural applications such as airport runways, a suitable coarse aggregate is needed. Some examples of suitable aggregate materials include gravel, limestone, and crushed granite. The coarse aggregate preferably has a size range from ⅜ to ¾ inch and preferably comprises about 30 to 45% by volume of the fresh concrete mix. The fine aggregate is preferably sand, but may contain other materials such as coal ash, slag, etc. as are known in the art. The fine aggregate preferably comprises 25 to 30% by volume of the fresh concrete mix.

The inventive concrete mixtures may have a range of fresh density, based on familiar variables such as the water/cement ratio, the nature and amount of coarse and fine aggregate, etc. In general, the fresh density is preferably in the range from about 135 to 145 pounds/cubic foot, or 3645 to 3915 pounds/cubic yard.

The water/cement ratio can be varied over some range, as is known in the art, with the understanding that as the water/cement ratio decreases, there may be a need to add various conventional additives to improve workability or other properties. Some of these additives and their functions are the following: W R Grace AdvaFlow 140M to increase workability and W R Grace Daravair 1000 to increase durability. In general, for the inventive mixtures, Applicants prefer a water/cement ratio in the range of about 0.3 to 0.5 by weight. Those skilled in the art will appreciate that the water to cement ratio must take into account the amount of both Portland cement and perlite and any other supplementary cementitious material such as fly ash, silica fume, ground granulated blast furnace slag, and metakaolin.

The foregoing examples show a number of surprising and useful properties of the inventive material compared to previously available materials, including previous materials that contain perlite in various forms:

Using a standard 5000 psi mix design, the inventive additive consistently produces concrete with more than twice the compressive strength of regular concrete. In addition, the flexural strength of the same material averages 60% more than a comparable conventional 5000 psi concrete.

The combination of high early strength and reduced permeability are desirable properties, which are not obtained with fly ash or slag (which exhibit low early strengths) or with silica fume (permeability reduction tends to level off).

Compared to perlite-containing grouts and wellbore fluids, the inventive materials contain coarse aggregate, which allows them to be used for structural applications. The inventive material is significantly stronger than low-density thermally insulating concrete, while markedly more spall resistant than conventional structural concrete.

We claim:

1. A durable concrete composition comprising:
   13 to 18 weight percent cement;
   ground, expanded perlite in an amount equal to about 2 to 25% of said cement, the ground, expanded perlite having a particle size less than 200 μm;
   30 to 45 volume percent coarse aggregate;
   25 to 30 volume percent fine aggregate; and
   water in an amount sufficient for workability.

2. The concrete composition of claim 1 wherein said ground expanded perlite is characterized by a volume weighted mean particle size of approximately 10-100 μm.

3. The concrete composition of claim 2 wherein said ground expanded perlite has 100% of the particles less than 200 μm, 90% below 80 μm, and a volume weighted mean of approximately 38 μm.

4. The concrete composition of claim 1 wherein said coarse aggregate comprises an aggregate selected from the group consisting of: gravel, limestone, and crushed granite, said aggregate having a size in the range of ⅜ to ¾ inch.

5. The concrete composition of claim 1 wherein said fine aggregate comprises sand.

6. The concrete composition of claim 1 further characterized by a water/cement ratio in the range of about 0.3 to 0.5 by weight.

7. The concrete composition of claim 1 further comprising at least one additive selected from the group consisting of: superplasticizers, naphthalene sulfonated water reducers, polycarboxylate water reducers, and air entraining agents.

8. The concrete composition of claim 1 wherein the 13 to 18 weight percent cement further comprises a supplementary cementitious material selected from the group consisting of: silica fume, fly ash, ground granulated blast furnace slag, and metakaolin.

9. A durable concrete composition comprising:
   13 to 18 weight percent cementitious material, said cementitious material comprising 98 to 75% Portland cement and 2 to 25% ground, expanded perlite;
   30 to 45 volume percent coarse aggregate;
   25 to 30 volume percent fine aggregate; and
   water in an amount sufficient for workability.

10. The concrete composition of claim 9 wherein said ground expanded perlite is characterized by a volume weighted mean particle size of approximately 10-100 μm.

11. The concrete composition of claim 10 wherein said ground expanded perlite has 100% of the particles less than 200 μm, 90% below 80 μm, and a volume weighted mean of approximately 38 μm.

12. The concrete composition of claim 9 wherein said coarse aggregate comprises an aggregate selected from the group consisting of: gravel, limestone, and crushed granite, said aggregate having a size in the range of ⅜ to ¾ inch.

13. The concrete composition of claim 9 wherein said fine aggregate comprises sand.

14. The concrete composition of claim 9 further characterized by a water/cement ratio in the range of about 0.3 to 0.5 by weight.

15. The concrete composition of claim 9 further comprising at least one additive selected from the group consisting of: superplasticizers, naphthalene sulfonated water reducers, polycarboxylate water reducers, and air entraining agents.

16. The concrete composition of claim 9 wherein the 13 to 18 weight percent cementitious material further comprises a supplementary cementitious material selected from the group consisting of: silica fume, fly ash, ground granulated blast furnace slag, and metakaolin.

* * * * *